(12) United States Patent
Hoefel et al.

(10) Patent No.: US 8,175,567 B2
(45) Date of Patent: May 8, 2012

(54) METHOD AND APPARATUS FOR SEARCHING FOR SIGNALS IN A WIRELESS COMMUNICATION SYSTEM

(75) Inventors: Guilherme Luiz Karnas Hoefel, La Jolla, CA (US); Parag Mohan Kanade, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1013 days.

(21) Appl. No.: 12/130,009

(22) Filed: May 30, 2008

(65) Prior Publication Data
US 2009/0298437 A1 Dec. 3, 2009

(51) Int. Cl.
*H04B 1/16* (2006.01)
(52) U.S. Cl. .............. 455/343.4; 455/574; 455/343.2; 455/67.11; 455/67.13; 455/68; 455/70; 455/161.1; 455/161.3; 455/434; 455/435.1
(58) Field of Classification Search .............. 455/574, 455/343.2–343.5, 161.1–161.3, 67.11, 67.13, 455/68–70, 434, 435.1–435.3
See application file for complete search history.

(56) References Cited

U.S. PATENT DOCUMENTS

| | | | |
|---|---|---|---|
| 5,574,996 A | | 11/1996 | Raith |
| 5,794,146 A | * | 8/1998 | Sevcik et al. ............... 455/434 |
| 6,167,268 A | * | 12/2000 | Souissi et al. ............... 455/434 |
| 6,249,678 B1 | * | 6/2001 | Mathai et al. ............... 455/437 |
| 6,400,961 B1 | * | 6/2002 | Lillie et al. ............... 455/552.1 |
| 6,985,758 B2 | * | 1/2006 | Rankin ............... 455/574 |
| 7,149,518 B2 | * | 12/2006 | Attimont et al. ............... 455/434 |
| 7,512,424 B2 | * | 3/2009 | Hossain et al. ............... 455/574 |
| 7,676,249 B2 | * | 3/2010 | Willey ............... 455/567 |
| 7,761,122 B2 | * | 7/2010 | HomChaudhuri ........... 455/574 |
| 8,010,123 B2 | * | 8/2011 | Zhao et al. ............... 455/452.2 |

FOREIGN PATENT DOCUMENTS

| | | |
|---|---|---|
| WO | WO9827766 A2 | 6/1998 |
| WO | WO2005046273 | 5/2005 |
| WO | WO2005101887 | 10/2005 |
| WO | WO2007009928 | 1/2007 |

OTHER PUBLICATIONS

International Search Report and the Written Opinion—PCT/US2009/045717 International Search Authority—European Patent Office—Sep. 10, 2009.

* cited by examiner

*Primary Examiner* — Tuan A Tran
(74) *Attorney, Agent, or Firm* — Liberty E. Mann

(57) ABSTRACT

Techniques to search for signals while in an out-of-service state are described. In an aspect, a network entity may collect information for wireless devices within a designated area, determine at least one search parameter (e.g., a scan rate) based on the collected information, and provide the search parameter(s) to wireless devices within the designated area. The wireless devices may perform searches for signals in accordance with the search parameter(s) when they are out of service. In another aspect, a wireless device may collect information related to out-of-service events encountered by the wireless device, send the collected information to the network entity, receive the search parameter(s) from the network entity, and perform searches in accordance with the search parameter(s) when out of service. In yet another aspect, the wireless device may determine the search parameter(s) based on the collected information.

46 Claims, 5 Drawing Sheets

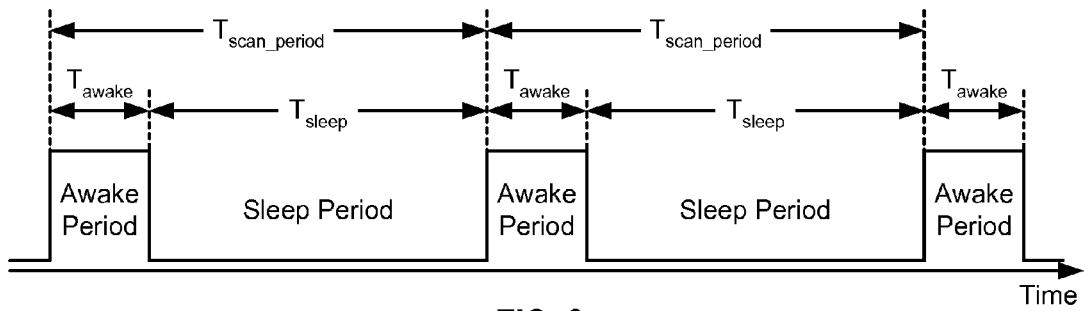
FIG. 2
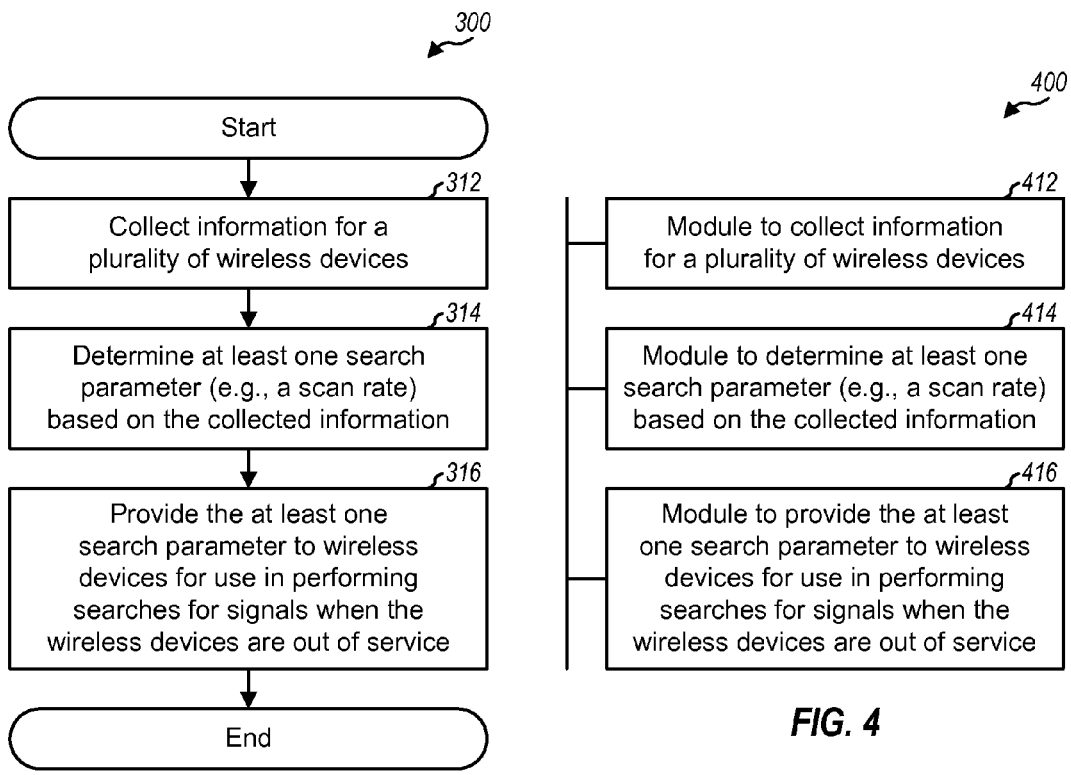
FIG. 3
FIG. 4

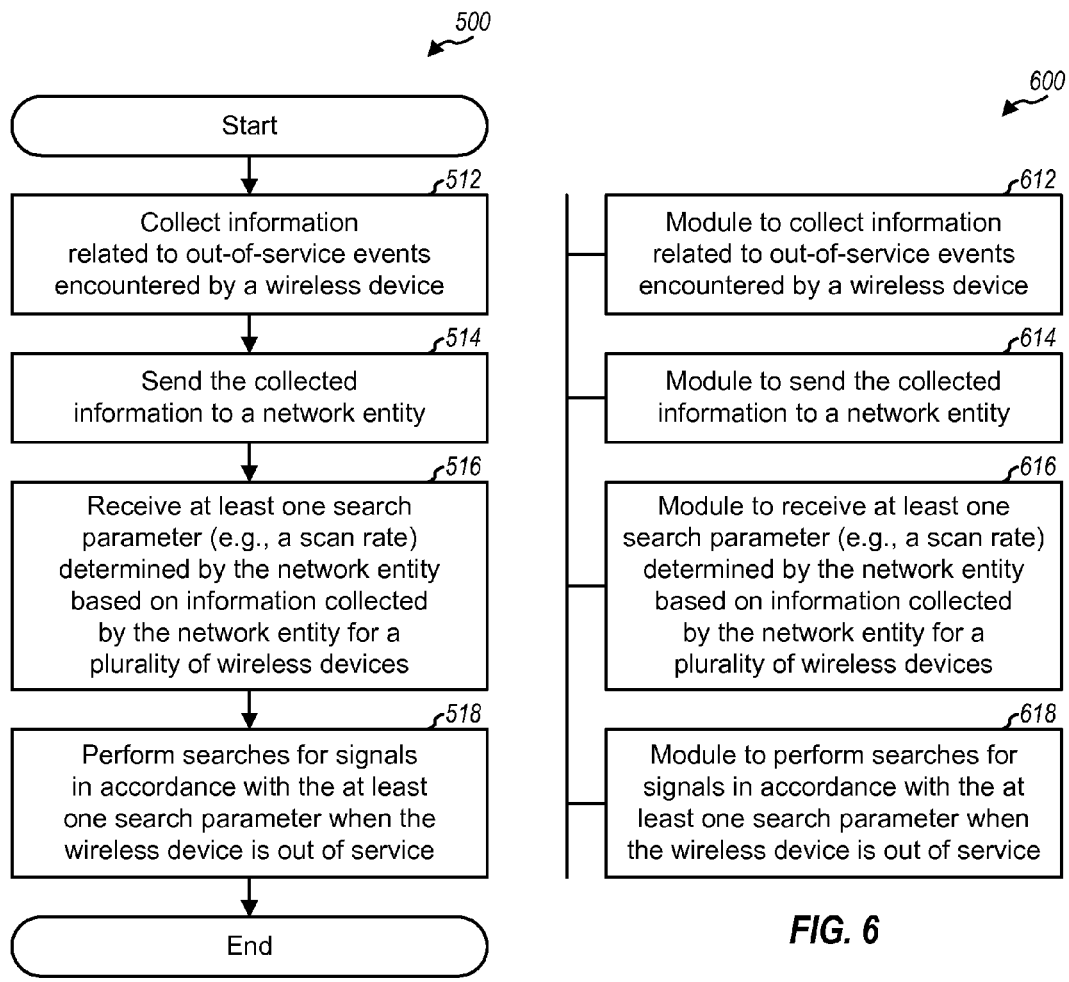

METHOD AND APPARATUS FOR SEARCHING FOR SIGNALS IN A WIRELESS COMMUNICATION SYSTEM

BACKGROUND

I. Field

The present disclosure relates generally to communication, and more specifically to techniques for searching for signals in a wireless communication system.

II. Background

Wireless communication systems are widely deployed to provide various communication services such as voice, video, packet data, messaging, broadcast, etc. These systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless device (e.g., a cellular phone) may be able to receive service from one or more wireless communication systems. Upon power up, the wireless device may search for signals from a system from which it may receive service. If a system is found, then the wireless device may register with the system. The wireless device may then actively communicate with the system or go into an idle mode if communication is not required. If the wireless device subsequently loses the system, then it may enter an out-of-service state and attempt to re-acquire a signal from which service may be obtained.

The wireless device may not have any knowledge of its operating environment while in the out-of-service state. The wireless device may not know whether or when it can re-acquire a signal since this may depend on various factors such as system deployment, user mobility, channel conditions, system loading, etc. The wireless device may consume a large amount of battery power if it continuously searches for signals while in the out-of-service state. This heavy battery power consumption may significantly reduce both standby time and talk time.

SUMMARY

Techniques to efficiently search for signals while in the out-of-service state are described herein. In an aspect, a network entity may collect information for a plurality of wireless devices. The collected information may comprise out-of-service durations, locations of wireless devices, frequency of out-of-service events, network loading, dropped calls, weather conditions, etc. The network entity may receive the information from the wireless devices and/or from other network entities such as base stations. The network entity may determine at least one search parameter based on the collected information. For example, the network entity may estimate an average out-of-service time for the wireless devices based on the collected information and may determine a scan rate based on the estimated average out-of-service time. The scan rate is the rate at which a wireless device performs a search for signals. The network entity may provide the at least one search parameter to wireless devices for use in performing searches for signals when these wireless devices are out of service.

In another aspect, a wireless device may collect information related to out-of-service events encountered by the wireless device. The collected information may comprise out-of-service durations, locations of the wireless device, frequency of out-of-service events, signal strength, etc. The wireless device may send the collected information to the network entity. The wireless device may receive at least one search parameter (e.g., a scan rate) determined by the network entity based on information collected for a plurality of wireless devices. The wireless device may perform searches in accordance with the at least one search parameter when it is out of service.

In yet another aspect, a wireless device may collect information related to out-of-service events encountered by the wireless device and may determine at least one search parameter based on the collected information. The wireless device may perform searches in accordance with the at least one search parameter when it is out of service. In one design, the wireless device may determine a first scan rate based on the collected information, receive a second scan rate from the network entity, determine a third scan rate based on the first and second scan rates, and perform searches in accordance with the third scan rate.

Various aspects and features of the disclosure are described in further detail below.

BRIEF DESCRIPTION OF THE DRAWINGS

FIG. 2 shows a design of periodically performing searches.
FIG. 3 shows a process for supporting searches for signals.
FIG. 4 shows an apparatus for supporting searches for signals.
FIG. 5 shows a process for operating a wireless device.
FIG. 6 shows an apparatus for operating a wireless device.

DETAILED DESCRIPTION

The techniques described herein may be used for various wireless communication systems such as CDMA, TDMA, FDMA, OFDMA and SC-FDMA systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. IS-2000 is also referred to as CDMA2000 1X, 1X, etc. IS-856 is also referred to as High Rate Packet Data (HRPD), 1xEV-DO, etc. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.16 (WiMAX), IEEE 802.20, Flash-OFDM®, etc. UTRA and E-UTRA are part of Universal Mobile Telecommunication System (UMTS). Long Term Evolution (LTE) is an upcoming release of UMTS that uses E-UTRA. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2).

Figure 1:
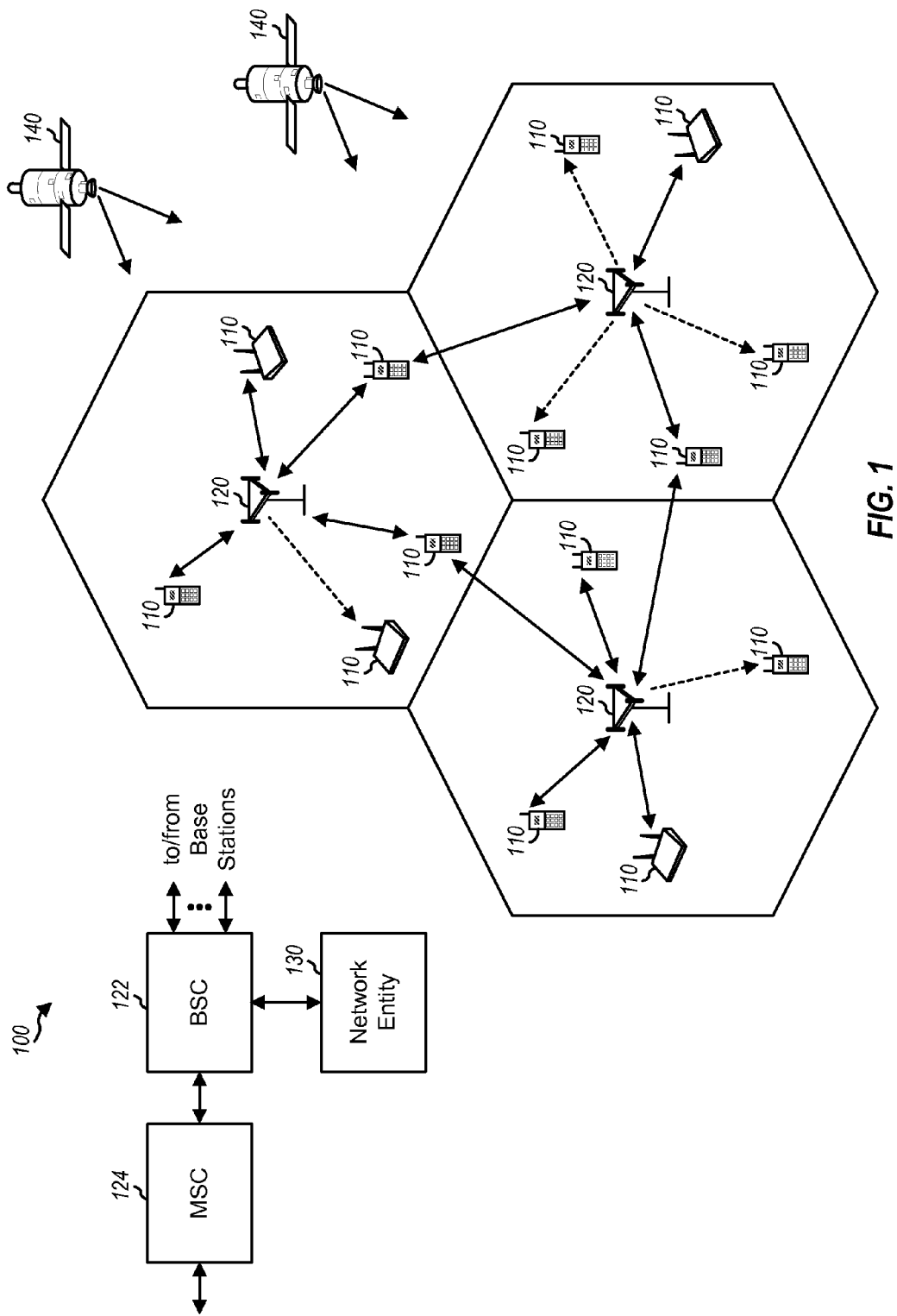
FIG. 1 shows a wireless communication system.

FIG. 1 shows a wireless communication system 100, which may also be referred to as an access network (AN) or a radio access network (RAN). System 100 may include a number of base stations 120. A base station is generally a fixed station that communicates with the wireless devices and may also be referred to as a Node B, an evolved Node B, an access point, etc. Each base station provides communication coverage for a particular geographic area. In 3GPP, the term "cell" can refer to the coverage area of a base station and/or a base station subsystem serving this area, depending on the context in which the term is used. In 3GPP, the term "sector" can refer to the coverage area of a base station and/or a base station subsystem serving this area.

A Base Station Controller (BSC) 122 may couple to a set of base stations and provide coordination and control for these base stations. A Mobile Switching Center (MSC) 124 may couple to a set of BSCs and support communication services for wireless devices. BSC 122 and MSC 124 may also be referred to by other names in other systems. System 100 may include other network entities not shown in FIG. 1. A network entity 130 may provide functionality to facilitate searches by wireless devices, as described below. Network entity 130 may be a separate entity that may couple to BSC 122 (as shown in FIG. 1), MSC 124, base stations 120, and/or other network entities. Network entity 130 may also be part of a base station, a BSC, an MSC, or some other network entity. Network entity 130 may also be referred to as a central entity, a network server, etc.

Wireless devices 110 may be dispersed throughout the system, and each wireless device may be stationary or mobile. A wireless device may also be referred to as a mobile station (MS), a user equipment (UE), a terminal, an access terminal, a subscriber unit, a station, etc. A wireless device may be a cellular phone, a personal digital assistant (PDA), a wireless modem, a handheld device, a laptop computer, etc. A wireless device may communicate with a base station on the forward and/or reverse link to obtain communication services. In FIG. 1, a solid line with arrows at both ends may represent active communication between a wireless device and a base station. A dashed line with an arrow at one end may represent a wireless device searching for a signal.

A wireless device may have positioning capability and may receive signals from satellites 140, which may be part of the United States Global Positioning System (GPS), the European Galileo system, the Russian GLONASS system, or a Global Navigation Satellite System (GNSS). The wireless device may measure signals from satellites 140 and obtain pseudo-range measurements for the satellites. Alternatively or additionally, the wireless device may measure signals from base stations 120 and obtain timing measurements for the base stations. The pseudo-range measurements and/or timing measurements may be used to derive a location estimate for the wireless device.

A wireless device may search for signals from a system upon power up. If a system is found, then the wireless device may operate in either (i) a connected mode and actively communicate with the system to obtain communication service or (ii) an idle mode and camp on the system if communication is not required. The wireless device may fail to acquire a system at power up (e.g., if the wireless device is in an area with no service) or may lose an acquired system while in the idle or connected mode (e.g., due to user mobility or radio link failure). The wireless device may then enter an out-of-service state and search for signals.

The wireless device may periodically perform searches to detect for a signal while in the out-of-service state. A search may also be referred to as a scan, a system search, a cell search, signal re-acquisition, etc. A search may be performed in different manners for different systems, as described below.

FIG. 2 shows a design of periodically performing searches while in the out-of-service state. In this design, the wireless device may wake up every scan period of $T_{scan\_period}$ seconds and perform a search for $T_{awake}$ seconds. The wireless device may sleep for $T_{sleep}$ seconds after the awake period and may power down as much circuitry as possible while asleep in order to conserve battery power. Each scan period may thus include an awake/on period of $T_{awake}$ seconds and a sleep/off period of $T_{sleep}$. The scan period and scan rate may be given as:

$$T_{scan\_period} = T_{awake} + T_{sleep}, \text{ and} \quad \text{Eq (1)}$$

$$R_{scan} = 1/T_{scan\_period}, \quad \text{Eq (2)}$$

where $R_{scan}$ is the scan rate.

In the design shown in FIG. 2, searches may be performed with a fixed awake period and a fixed scan period. In another design, searches may be performed with a fixed awake period and a variable scan period. In yet another design, searches may be performed with a variable scan period and a fixed duty cycle for the awake period. For all designs, the scan rate and/or awake period may be selected based on a tradeoff between battery life and signal re-acquisition performance. A faster scan rate and/or a longer awake period may be selected for faster signal re-acquisition. A slower scan rate and/or a shorter awake period may be selected for longer battery life.

The wireless device may perform searches in various manners while in the out-of-service state. In one design, which may be referred to as uniform searches, the wireless device may perform searches at a fixed scan rate for the entire duration of the out-of-service state. In another design, which may be referred to as telescopic searches, the wireless device may perform searches at progressively slower scan rates while in the out-of-service state. For example, the wireless device may perform searches at an initial scan rate for the first X seconds, then perform searches at a slower scan rate for the next Y seconds, then perform searches at an even slower scan rate for the next Z seconds, etc. For both designs, the scan rate(s) and the awake period may be determined a priori (e.g., during the design phase of the wireless device) and may be used whenever the wireless device goes out of service. Using pre-configured scan rate(s) and awake period may provide sub-optimal performance in many scenarios.

In an aspect, the scan rate and/or some other parameters for searches may be determined based on one or more of the following:

Network information—any information related to the operational characteristics of the system such as system loading, the number of dropped calls, etc., Device information—any information related to the status of the wireless device such as the amount of available battery, etc., and Environmental information—any information that is not network information or device information.

In general, any information that may be pertinent in determining parameters for searches may be collected. The collected information may be used to determine a single scan rate to use for uniform searches for the entire duration of the out-of-service state. The collected information may also be used to determine progressively slower scan rates for telescopic searches. In general, the collected information may be used to determine one or more search parameters such as scan rate, awake time, sleep time, search duty cycle (which is the ratio of the awake time to the scan period), etc. For simplicity, the use of the collected information to determine a scan rate is described below. This scan rate may be the single scan rate used for uniform searches for the entire duration of the outof-service state, the initial scan rate among the progressively slower scan rates for telescopic searches, etc. The slower scan rates may be determined based on the initial scan rate.

In one design, a wireless device may collect environmental and device information. The wireless device may use the collected information to determine its scan rate. Alternatively or additionally, the wireless device may send the collected information to network entity 130, which may use the collected information from many wireless devices to determine the scan rate to use by the wireless devices.

The wireless device may collect some or all of the following environmental information:

When (e.g., date and time) the wireless device goes out of service,

The location of the wireless device when it goes out of service,

When the wireless device re-acquires a signal,

The location of the wireless device when it re-acquires a signal,

Whether the wireless device is mobile or stationary when it goes out-of-service, The duration of each out-of-service event, How frequently the wireless device goes out-of-service, and Signal strength, system identifier (ID), time, and location of the wireless device.

The out-of-service duration is the amount of time from when the wireless device goes out of service to when the wireless device re-acquires a signal. The out-of-service duration may also be referred to as out-of-service time, re-acquisition time, etc.

The wireless device may collect some or all of the information listed above, depending on its capability. For example, the location of the wireless device may be available if the wireless device has positioning capability and may be unavailable otherwise. The location of the wireless device may have fine or coarse accuracy depending on the positioning capability of the wireless device, e.g., fine accuracy for satellite-based positioning and coarse accuracy for network-based positioning. The wireless device may also collect other types of environmental information.

The wireless device may collect some or all of the following device information:

The amount of battery power available at the wireless device,

Whether the wireless device is in the connected mode or the idle mode when it goes out of service, and Whether the wireless device has a voice or data call when it goes out of service.

The wireless device may also collect other types of device information.

The wireless device may determine the scan rate based on the collected information. The wireless device may also send the collected information to network entity 130, e.g., after the wireless device re-acquires a signal. The wireless device may also aggregate the collected information and send the information to network entity 130 at a convenient time, e.g., during off-peak hours. The wireless device may automatically report the collected information to network entity 130 as a background task without requiring inputs from the user.

In another design, network entity 130 may collect information from wireless devices and/or information from other network entities such as base station 120, BSC 122, MSC 124, etc. In general, network entity 130 may collect information for a designated area of any size. For example, the designated area may comprise the coverage area of a base station, the coverage area of a set of base stations, the coverage area of a BSC, the coverage area of an MSC, etc.

Network entity 130 may collect some or all of the following environmental information:

The environmental information collected by the wireless devices,

How many wireless devices are out of service,

The durations of the out-of-service events encountered by the wireless devices,

How often the wireless devices go out of service,

The locations of the wireless devices, e.g., before going out of service and after re-acquiring a signal, How many calls are dropped in the designated area, and Weather conditions in the designated area.

The locations of the wireless devices may be determined by the wireless devices and reported to network entity 130. The locations of the wireless devices may also be determined based on reverse link signals sent by the wireless devices and measured by the base stations. Network entity 130 may also collect other types of environmental information.

Network entity 130 may collect some or all of the following network information:

Network loading in the designated area,

Types of calls made by wireless devices in the designated area,

Throughputs of the calls made by the wireless devices, and

Number of base stations in an active set of each wireless device.

Network entity 130 may also collect other types of network information. Network entity 130 may also collect device information from the wireless devices in the designated area.

In general, network entity 130 and/or a wireless device may determine the scan rate based on various schemes or algorithms. Different schemes may be used depending on the types of information available and the desired optimization criteria, e.g., to extend battery life, to improve re-acquisition performance, or both. Several example schemes for determining the scan rate are described below.

In one design, the scan rate may be determined based on an average out-of-service time. An entity (e.g., a wireless device or network entity 130) may collect information on the duration of each out-of-service event and may determine the average out-of-service time. For example, the wireless device may determine the duration of each out-of-service event encountered by the wireless device and may determine the average out-of-service time for the wireless device. Network entity 130 may obtain the duration of each out-of-service event encountered by wireless devices within the designated area and may determine the average out-of-service time for all wireless devices within the designated area. The average out-of-service time may also be estimated based on environmental information, network information, and/or device information. In any case, the scan rate may be set based on the average out-of-service time. In one design, if the average out-of-service time is T seconds, then the scan rate may be equal to T seconds or to $\eta \cdot T$ seconds, where $\eta$ is a scaling factor that may be dependent on the desired optimization criterion. For example, $\eta$ may be a smaller value (e.g., $\eta<1$) to improve re-acquisition performance or a larger value (e.g., $\eta>1$) to extend battery life.

The design described above determines the scan rate such that good performance (in terms of battery life and/or re-acquisition performance) can be obtained on average. Location information is not used in determining the average out-of-service time and the scan rate. The wireless device may determine the scan rate based on its average out-of-service time and use this scan rate whenever it goes out of service.

Network entity 130 may also determine the scan rate based on the average out-of-service time for all wireless devices within the designated area and may provide this scan rate to the wireless devices. Each wireless device may then use the scan rate provided by network entity 130 whenever that wireless device goes out of service.

In one design, the scan rate may be adaptively updated by network entity 130 to improve re-acquisition performance and/or battery life. Network entity 130 may determine a scan rate of R (e.g., R=once every 10 seconds) based on the collected information, e.g., as described above. The wireless devices within the designated area may perform searches at the scan rate of R determined by network entity 130.

The average re-acquisition time of the wireless devices may be dependent on (e.g., may be approximately equal to) the scan period, which is T=1/R. Network entity 130 may hypothesize that a higher scan rate might improve the average re-acquisition time. Network entity 130 may then direct the wireless devices to use the higher scan rate of $R_{higher1}$ (e.g., $R_{higher1}$=once every 5 seconds) in an attempt to decrease the average re-acquisition time. Network entity 130 may then collect information on the out-of-service durations and determine the average re-acquisition time with the wireless devices using the higher scan rate. If the new average re-acquisition time is shorter than T, then the higher scan rate improves the average re-acquisition time. Network entity 130 may then use the higher scan rate of $R_{higher1}$ instead of the original scan rate of R.

Network entity 130 may attempt to further improve the scan rate for faster re-acquisition time. In the example above, if the average re-acquisition time is close to $1/R_{higher1}$ with the higher scan rate of $R_{higher1}$, then network entity 130 may select an even higher scan rate of $R_{higher2}$, e.g., $R_{higher2}$=once every 2.5 seconds. Network entity 130 may then collect information on the out-of-service durations, determine whether the higher scan rate of $R_{higher2}$ improves the average re-acquisition time, and select the scan rate accordingly. Conversely, in the example above, if the average re-acquisition time is close to T with the higher scan rate of $R_{higher1}$, then network entity 130 may select a scan rate between $R_{higher1}$ and R, e.g., $R_{higher3}$=once every 7.5 seconds. Network entity 130 may then collect information on the out-of-service durations, determine whether the scan rate of $R_{higher3}$ improves the average re-acquisition time, and select the scan rate accordingly. Network entity 130 may iteratively adjust the scan rate (e.g., using a binary search or a linear search) until the average re-acquisition time no longer improves or is adequate.

In another design, a coverage map may be determined based on the collected information and may be used to determine the scan rate. Network entity 130 may obtain the locations of the wireless devices, the out-of-service durations, and/or other information when the wireless devices go out of service. Network entity 130 may identify areas of good coverage with short out-of-service durations and areas of poor coverage with long out-of-service durations. Network entity 130 may determine suitable scan rates for different areas based on the average out-of-service durations for these areas. Network entity 130 may provide the scan rate for each area to wireless devices located within that area. Each wireless device may perform searches based on the scan rate applicable for its current location.

In another design, additional information may be used to further refine the scan rate. The scan rate may be a function of one or more types of information collected by network entity 130. Network entity 130 may obtain the out-of-service durations, network loading, weather conditions, time of day, and/or other information when the wireless devices go out of service. Network entity 130 may determine the scan rate for different values of the collected information. For example, network entity 130 may determine the average out-of-service time for different weather conditions such as sunny, cloudy, rainy, etc. Network entity 130 may then determine the scan rate for each weather condition based on the average out-of-service time for that weather condition. Network entity 130 may provide the scan rate for the current weather condition to the wireless devices.

In general, network entity 130 may determine the scan rate based on a function of any type of information or any combination of information. For example, network entity 130 may determine the scan rate based on a function of network loading, a function of time of day, etc. The function(s) for scan rate versus different types of information may be implemented with look-up tables, linear and/or non-linear equations, etc. Network entity 130 may provide the appropriate scan rate to the wireless devices based on the current operating conditions for the wireless devices.

In another design, different scan rates may be defined for different optimization criteria. For example, a faster scan rate of $R_{fast}$ may be used for faster re-acquisition time, a slower scan rate of $R_{slow}$ may be used to extend battery life, and a nominal scan rate of $R_{nom}$ may be used for both, where $R_{Slow} < R_{nom} < R_{fast}$. One scan rate (e.g., $R_{nom}$) may be determined based on the collected information. The other scan rates (e.g., $R_{fast}$ and $R_{slow}$) may be a function of the determined scan rate. A wireless device may use a suitable scan rate depending on the desired performance. For example, the wireless device may use the slower scan rate of $R_{slow}$ when its battery is low or when it goes out of service in the idle mode. The wireless device may use the faster scan rate of $R_{fast}$ when its battery is fully charged or when it goes out of service in the connected mode.

In general, the various designs described above for determining the scan rate may be performed by network entity 130 and/or by a wireless device. Network entity 130 may determine the scan rate based on collected information for all wireless devices within the designated area covered by network entity 130. Network entity 130 may provide the scan rate to the wireless devices, e.g., when they enter the designated area. Network entity 130 may also update the scan rate, e.g., as described above, and may provide the updated scan rate to the wireless devices at any time while these wireless devices are serviced by network entity 130. A wireless device may receive the scan rate from network entity 130 while the wireless device is in service, store the scan rate, and perform searches in accordance with the scan rate at a later time when the wireless device goes out of service.

A wireless device may determine its scan rate based on information collected by the wireless device. In one design, the wireless device may perform searches based on the scan rate determined by the wireless device. In another design, the wireless device may determine a scan rate of $R_{wd}$ based on its collected information and may also receive a scan rate of $R_{ne}$ determined by network entity 130 based on collected information for wireless devices within the designated area. In one design, the wireless device may determine a final scan rate of $R_{final}$ based on its computed scan rate and the received scan rate, as follows:

$$R_{final} = \alpha_{wd} \cdot R_{wd} + \alpha_{ne} \cdot R_{ne}, \qquad \text{Eq (3)}$$

where $\alpha_{wd}$ is a weight for the scan rate determined by the wireless device, and $\alpha_{ne}$ is a weight for the scan rate received from network entity 130.

Each weight may have a value within a range of 0 to 1. A larger value of $\alpha_{wd}$ may be used to give more weight to the scan rate determined by the wireless device. A larger value of $\alpha_{ne}$ may be used to give more weight to the scan rate determined by network entity 130. The weights may be constrained such that $\alpha_{wd}+\alpha_{ne}=1$. The wireless device may perform searches based on the final scan rate.

In one design, which may be referred to as fixed rate scanning, a scan rate may be obtained for a wireless device at a predetermined time. This scan rate may be determined by the wireless device, provided by network entity 130, or derived based on the scan rate determined by the wireless device and the scan rate provided by the network entity, as described above. The wireless device may use this scan rate for the entire duration in which it is within the designated area and serviced by network entity 130.

In another design, which may be referred to as variable rate scanning, the scan rate for the wireless device may be changed by network entity 130 and/or the wireless device. The change in the scan rate may occur at any time while the wireless device is within the designated area and covered by network entity 130.

For clarity, the techniques have been specifically described above for determining the scan rate for searches. The techniques may also be used to determine (i) other search parameters such as awake time, sleep time, etc., (ii) signal processing parameters such as coherent accumulation time, non-coherent accumulation time, etc., and/or (iii) other parameters applicable for searches.

For clarity, the techniques have been specifically described above for searches performed by a wireless device when it is out of service and not receiving a suitable signal from any base station. The techniques may also be used to determine search parameters for other types of searches such as searches for signals from other systems or radio technologies (i.e., inter-system searches), searches for signals on other frequency channels (i.e., inter-frequency searches), searches for signals from other cells, etc. The term "out of service" may thus encompass any of the scenarios described above and may refer to being out of service with respect to another system, another radio technology, another frequency channel, another cell, etc.

FIG. 3 shows a design of a process 300 for supporting searches for signals in a wireless communication system. Process 300 may be performed by network entity 130 (as described below) or by some other entity. Network entity 130 may collect information for a plurality of wireless devices (block 312). The collected information may comprise out-of-service durations, locations of wireless devices, frequency of out-of-service events, network loading, dropped calls, weather conditions, other types of information given above, or a combination thereof. Network entity 130 may receive the information from the plurality of wireless devices and/or from at least one other network entity, e.g., base stations 120, BSC 122, MSC 124, etc.

Network entity 130 may determine at least one search parameter based on the collected information (block 314). In one design, the at least one search parameter may comprise a scan rate corresponding to a rate for performing searches. In another design, the at least one search parameter may comprise (i) a first scan rate to use in performing searches when longer battery life is desired and (ii) a second scan rate to use in performing searches when faster signal re-acquisition is desired, with the second scan rate being faster than the first scan rate. The at least one search parameter may comprise other parameters, as described above.

In one design of block 314, network entity 130 may estimate an average out-of-service time for the plurality of wireless devices based on the collected information. Network entity 130 may then determine a scan rate based on the estimated average out-of-service time. Network entity 130 may also adjust the scan rate, determine an updated average out-of-service time with the adjusted scan rate, and use the adjusted scan rate if the updated average out-of-service time is improved over (i.e., shorter than) the estimated average out-of-service time. Network entity 130 may iteratively adjust the scan rate until a termination condition is encountered, which may occur when the average out-of-service time is acceptable or cannot be further improved. Network entity 130 may then use the scan rate obtained when the termination condition is encountered.

In another design of block 314, network entity 130 may determine a coverage map based on the collected information for the plurality of wireless devices. The coverage map may be obtained by identifying areas of poor coverage with long average out-of-service time and areas of good coverage with short average out-of-service time. These different areas may be identified based on the out-of-service durations and the locations of the plurality of wireless devices, which may be provided by the collected information. The average out-of-service time may be deemed to be long if it exceeds a first threshold or short if it is less than a second threshold, with the thresholds being suitably selected values. Network entity 130 may determine at least one scan rate for at least one area based on the coverage map. For example, the areas of poor coverage may be associated with slower scan rates, and the areas of good coverage may be associated with faster scan rates.

Network entity 130 may provide the at least one search parameter to wireless devices for use in performing searches for signals when the wireless devices are out of service (block 316). Network entity 130 may collect information for wireless devices located within a designated area and may provide the at least one search parameter to wireless devices located within the designated area.

FIG. 4 shows a design of an apparatus 400 for supporting searches for signals. Apparatus 400 includes a module 412 to collect information for a plurality of wireless devices, a module 414 to determine at least one search parameter (e.g., a scan rate) based on the collected information, and a module 416 to provide the at least one search parameter to wireless devices for use in performing searches for signals when the wireless devices are out of service.

FIG. 5 shows a design of a process 500 for operating a wireless device. The wireless device may collect information related to out-of-service events encountered by the wireless device (block 512). The collected information may comprise out-of-service durations, locations of the wireless device, frequency of out-of-service events, signal strength, any of the information described above, or a combination thereof. The wireless device may send the collected information to a network entity for use in determining at least one search parameter (block 514). The wireless device may receive the at least one search parameter determined by the network entity based on information collected by the network entity for a plurality of wireless devices (block 516). The wireless device may thereafter perform searches for signals in accordance with the at least one search parameter when the wireless device is out of service (block 518).

The at least one search parameter may comprise a scan rate to use for the entire duration in which the wireless device is covered by the network entity. Alternatively, the at least one search parameter may comprise a scan rate that is changeable by the network entity during the time in which the wireless device is covered by the network entity. In any case, the wireless device may perform searches at the scan rate when it is out of service. In one design, the wireless device may determine its current operating conditions, e.g., its location, received signal strength, operating mode, available battery power, etc. The wireless device may adjust the scan rate based on its current operating conditions and may perform searches at the adjusted scan rate.

FIG. 6 shows a design of an apparatus 600 for operating a wireless device. Apparatus 600 includes a module 612 to collect information related to out-of-service events encountered by the wireless device, a module 614 to send the collected information to a network entity, a module 616 to receive at least one search parameter determined by the network entity based on information collected by the network entity for a plurality of wireless devices, and a module 618 to perform searches for signals in accordance with the at least one search parameter when the wireless device is out of service.

Figure 7:
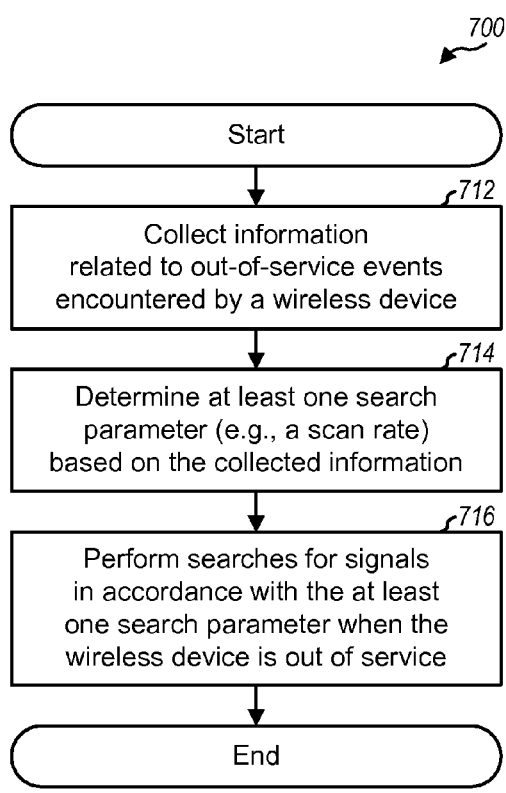
FIG. 7 shows another process for operating a wireless device.

FIG. 7 shows a design of a process 700 for operating a wireless device. The wireless device may collect information related to out-of-service events encountered by the wireless device, e.g., the information described above for FIG. 5 (block 712). The wireless device may determine at least one search parameter based on the collected information (block 714). The wireless device may perform searches for signals in accordance with the at least one search parameter when it is out of service (block 716).

In one design of block 714, the wireless device may estimate an average out-of-service time for the wireless device based on the collected information. The wireless device may then determine a scan rate based on the estimated average out-of-service time. In one design, the wireless device may determine its current operating conditions, e.g., its location, received signal strength, operating mode, available battery power, etc. The wireless device may determine the scan rate based further on its current operating conditions.

In one design, the wireless device may determine a first scan rate based on the collected information and may receive a second scan rate from a network entity. The wireless device may determine a third scan rate based on the first and second scan rates. The wireless device may then perform searches in accordance with the third scan rate when it is out of service.

Figure 8:
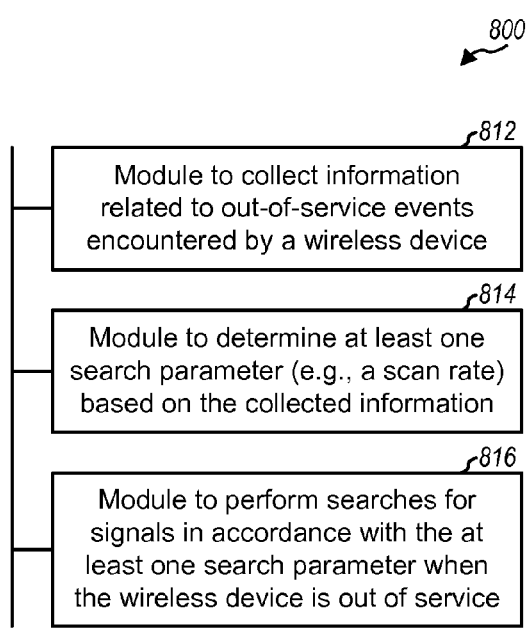
FIG. 8 shows another apparatus for operating a wireless device.

FIG. 8 shows a design of an apparatus 800 for operating a wireless device. Apparatus 800 includes a module 812 to collect information related to out-of-service events encountered by the wireless device, a module 814 to determine at least one search parameter based on the collected information, and a module 816 to perform searches for signals in accordance with the at least one search parameter when the wireless device is out of service.

The modules in FIGS. 4, 6 and 8 may comprise processors, electronics devices, hardware devices, electronics components, logical circuits, memories, etc., or any combination thereof.

A wireless device may perform a search in different manners for different systems or radio technologies. For a search in WCDMA, the wireless device may perform one or more frequency scans to detect for strong frequency channels in a frequency band. The wireless device may then attempt acquisition on each strong frequency channel, e.g., using a three-step process. In step one, the wireless device may search for a 256-chip primary synchronization code (PSC) sent on a primary synchronization channel (SCH) by correlating a received signal at the wireless device with a locally generated PSC at different time offsets. The wireless device may use the PSC to detect for the presence of a cell and to ascertain slot timing of that cell. In step two, the wireless device may determine a pattern of secondary synchronization codes (SSCs) used by each cell for which the PSC has been detected. The wireless device can determine frame timing and a scrambling code group used for a cell based on the detected SSC pattern for that cell. In step three, the wireless device may determine the scrambling code used by each cell for which the SSC pattern has been detected. Each SSC pattern is associated with a group of eight scrambling codes. The wireless device may evaluate each of the eight scrambling codes to determine which scrambling code is used by the cell.

For a search in GSM, the wireless device may perform a power scan to measure received power of each radio frequency (RF) channel in a frequency band and may identify strong RF channels. The wireless device may then attempt acquisition on each strong RF channel by (i) detecting for a tone sent on a frequency correction channel (FCCH), (ii) decoding a burst sent on a synchronization channel (SCH) to obtain a base transceiver station identity code (BSIC) for a GSM cell, and (iii) decoding a broadcast control channel (BCCH) to obtain system information.

For a search in 1X or HRPD, the wireless device may search for pilots on different frequency channels, e.g., on one or more most recently used frequency channels and/or one or more frequency channels in a preferred roaming list (PRL). The wireless device may then attempt acquisition on each frequency channel in which pilot is detected.

In one design, the wireless device may complete a search prior to going to sleep. In this design, the awake period may be variable and may be dependent on various factors such as the number of frequency channels detected, the received signal strength, etc. In another design, the wireless device may perform a search for a fixed awake period. If the search is not completed during the awake period, then state information for the search may be saved, and the search may be resumed in the next awake period.

Figure 9:
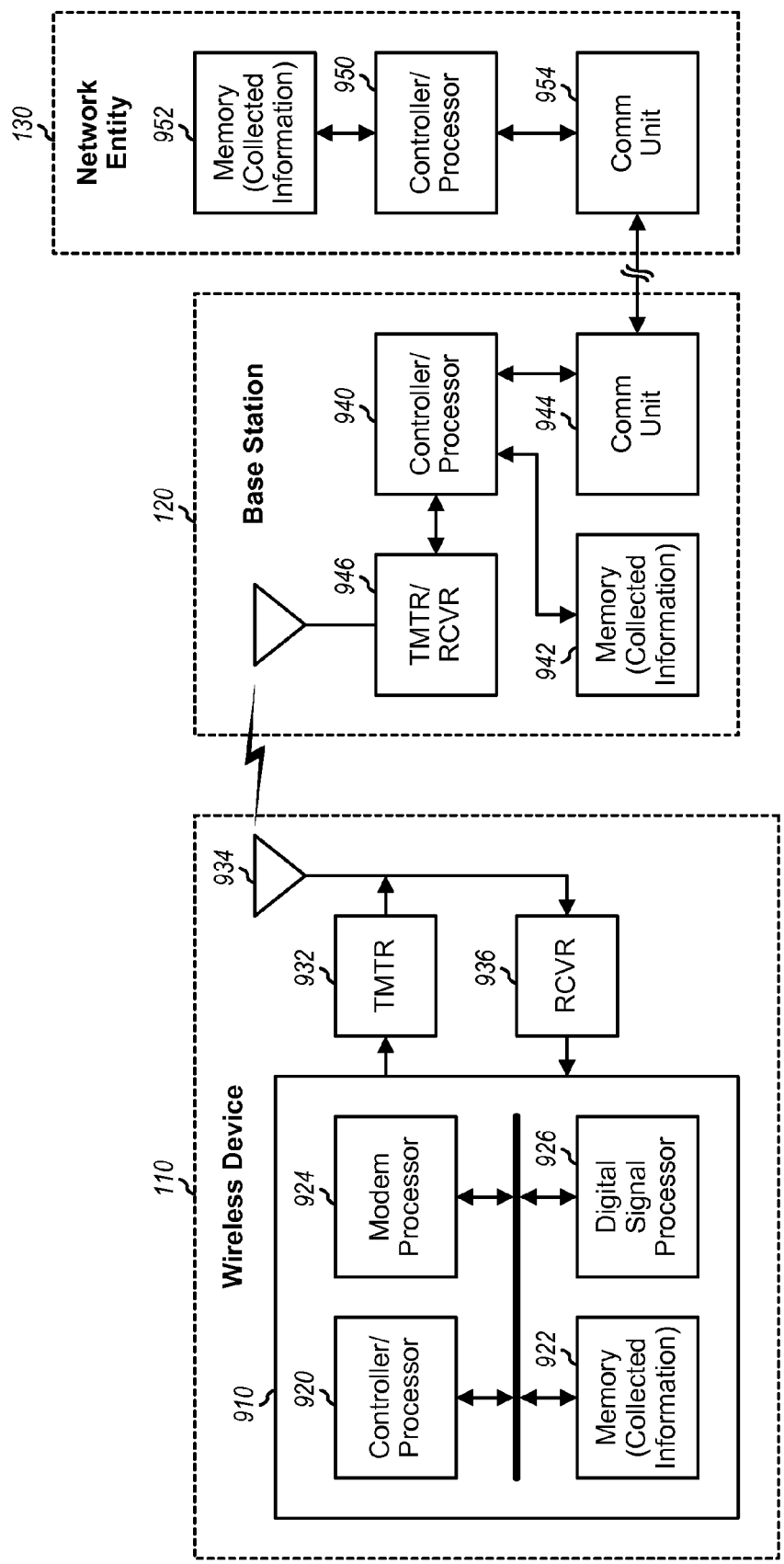
FIG. 9 shows a block diagram of a wireless device, a base station, and a network entity.

FIG. 9 shows a block diagram of a design of wireless device 110, base station 120, and network entity 130 in FIG. 1. At wireless device 110, a modem processor 924 may receive data to be sent by the wireless device, process (e.g., encode and modulate) the data, and generate output chips. A transmitter (TMTR) 932 may condition (e.g., convert to analog, filter, amplify, and frequency upconvert) the output chips and generate a reverse link signal, which may be transmitted via an antenna 934. On the forward link, antenna 934 may receive forward link signals from base station 120 and/or other base stations. A receiver (RCVR) 936 may condition (e.g., filter, amplify, frequency downconvert, and digitize) the received signal from antenna 934 and provide samples. Modem processor 924 may process (e.g., demodulate and decode) the samples and provide decoded data. Modem processor 924 may also perform searches in accordance with a suitable scan rate when wireless device 110 is out of service. Modem processor 924 may perform processing and searches in accordance with a radio technology (e.g., CDMA 1X, HRPD, WCDMA, GSM, etc.) utilized by the system.

A controller/processor 920 may direct the operation at wireless device 110. Controller/processor 920 may perform or direct process 500 in FIG. 5, process 700 in FIG. 7, and/or other processes for the techniques described herein. Controller/processor 920 may also collect information related to out-of-service events encountered by wireless device 110. A memory 922 may store program codes and data for wireless device 110. Memory 922 may also store the collected information, which may be used by controller/processor 920 to determine a scan rate and/or may be sent to network entity 130. A digital signal processor 926 may perform various types of processing for wireless device 110. Processors 920, 924 and 926 and memory 922 may be implemented on an application specific integrated circuit (ASIC) 910. Memory 922 may also be implemented external to the ASIC.

At base station 120, transmitter/receiver (TMTR/RCVR) 946 may support radio communication with wireless device 110 and/or other wireless devices. A controller/processor 940 may perform various functions for communication with the wireless devices. Controller/processor 940 may also perform or direct process 300 in FIG. 3 and/or other processes for the techniques described herein. Controller/processor 940 may also collect information for wireless devices served by base station 120, e.g., the environment and network information described above. A memory 942 may store program codes and data for base station 120. Memory 942 may also store the collected information, which may be used by controller/processor 940 to determine a scan rate and/or may be sent to network entity 130. A communication (Comm) unit 944 may support communication with other network entities, e.g., network entity 130. In general, base station 120 may include any number of controllers, processors, memories, transmitters, receivers, communication units, etc.

At network entity 130, a controller/processor 950 may perform various functions to support searches by the wireless devices. Controller/processor 950 may perform or direct process 300 in FIG. 3 and/or other processes for the techniques described herein. A memory 952 may store program codes and data for network entity 130. Memory 952 may also store collected information, which may be received from the wireless devices, base stations, and/or other network entities. Controller/processor 950 may determine the scan rate and/or other search parameters based on the collected information. A communication unit 954 may support communication with other network entities, e.g., base station 120, BSC 122, MSC 124, etc. In general, network entity 130 may include any number of controllers, processors, memories, communication units, etc.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A method of supporting searches for signals in a wireless communication system, comprising:
    collecting information for a plurality of wireless devices;
    determining at least one search parameter based on the collected information; and
    providing the at least one search parameter to wireless devices for use in performing searches for signals when the wireless devices are out of service.

2. The method of claim 1, wherein the collecting information comprises collecting information on out-of-service durations, locations of wireless devices, frequency of out-of-service events, network loading, dropped calls, weather conditions, or a combination thereof.

3. The method of claim 1, further comprising:
    receiving the information for the plurality of wireless devices from the plurality of wireless devices, or from at least one network entity, or both.

4. The method of claim 1, wherein the at least one search parameter comprises a scan rate corresponding to a rate for performing searches.

5. The method of claim 1, wherein the at least one search parameter comprises a first scan rate to use in performing searches when longer battery life is desired, and a second scan rate to use in performing searches when faster signal reacquisition is desired, the second scan rate being faster than the first scan rate.

6. The method of claim 1, wherein the determining the at least one search parameter comprises
    estimating an average out-of-service time for the plurality of wireless devices based on the collected information, and
    determining a scan rate based on the estimated average out-of-service time.

7. The method of claim 6, wherein the determining the at least one search parameter further comprises
    adjusting the scan rate,
    determining an updated average out-of-service time with the adjusted scan rate, and
    using the adjusted scan rate if the updated average out-of-service time is improved over the estimated average out-of-service time.

8. The method of claim 7, wherein the determining the at least one search parameter further comprises
    iteratively performing the adjusting the scan rate and the determining the updated average out-of-service time until a termination condition is encountered, and
    using a final adjusted scan rate obtained when the termination condition is encountered.

9. The method of claim 1, wherein the determining the at least one search parameter comprises
    determining a coverage map based on the collected information for the plurality of wireless devices, and
    determining at least one scan rate for at least one area based on the coverage map.

10. The method of claim 9, wherein the determining the coverage map comprises
    obtaining out-of-service durations and locations of the plurality of wireless devices from the collected information, and
    identifying areas of poor coverage with long out-of-service time and areas of good coverage with short out-of-service time based on the out-of-service durations and the locations of the plurality of wireless devices.

11. The method of claim 10, wherein the areas of poor coverage are associated with scan rates slower than scan rates for areas of good coverage.

12. The method of claim 1, wherein the collecting information comprises collecting information for the plurality of wireless devices located within a designated area, and wherein the providing the at least one search parameter comprises providing the at least one search parameter to wireless devices located within the designated area.

13. An apparatus supporting searches for signals, comprising:
    at least one processor configured to collect information for a plurality of wireless devices, to determine at least one search parameter based on the collected information, and to provide the at least one search parameter to wireless devices for use in performing searches for signals when the wireless devices are out of service.

14. The apparatus of claim 13, wherein the at least one processor is configured to collect information on out-of-service durations, locations of wireless devices, frequency of out-of-service events, network loading, dropped calls, weather conditions, or a combination thereof.

15. The apparatus of claim 13, wherein the at least one processor is configured to estimate an average out-of-service time for the plurality of wireless devices based on the collected information, and to determine a scan rate based on the estimated average out-of-service time.

16. The apparatus of claim 15, wherein the at least one processor is configured to adjust the scan rate, to determine an updated average out-of-service time with the adjusted scan rate, and to use the adjusted scan rate if the updated average out-of-service time is improved over the estimated average out-of-service time.

17. The apparatus of claim 13, wherein the at least one processor is configured to determine a coverage map based on the collected information for the plurality of wireless devices, and to determine at least one scan rate for at least one area based on the coverage map.

18. An apparatus supporting searches for signals, comprising:
    means for collecting information for a plurality of wireless devices;
    means for determining at least one search parameter based on the collected information; and
    means for providing the at least one search parameter to wireless devices for use in performing searches for signals when the wireless devices are out of service.

19. The apparatus of claim 18, wherein the means for collecting information comprises means for collecting information on out-of-service durations, locations of wireless devices, frequency of out-of-service events, network loading, dropped calls, weather conditions, or a combination thereof.

20. The apparatus of claim 18, wherein the means for determining the at least one search parameter comprises
    means for estimating an average out-of-service time for the plurality of wireless devices based on the collected information, and
    means for determining a scan rate based on the estimated average out-of-service time.

21. The apparatus of claim 18, wherein the means for determining the at least one search parameter comprises
    means for determining a coverage map based on the collected information for the plurality of wireless devices, and
    means for determining at least one scan rate for at least one area based on the coverage map.

22. A computer program product, comprising:
    a non-transitory computer-readable medium comprising:
        code for causing at least one computer to collect information for a plurality of wireless devices;

code for causing the at least one computer to determine at least one search parameter based on the collected information; and code for causing the at least one computer to provide the at least one search parameter to wireless devices for use in performing searches for signals when the wireless devices are out of service.

23. The computer program product of claim 22, wherein the non-transitory computer-readable medium further comprises:

code for causing the at least one computer to estimate an average out-of-service time for the plurality of wireless devices based on the collected information; and code for causing the at least one computer to determine a scan rate based on the estimated average out-of-service time.

24. The computer program product of claim 22, wherein the non-transitory computer-readable medium further comprises:

code for causing the at least one computer to determine a coverage map based on the collected information for the plurality of wireless devices; and code for causing the at least one computer to determine at least one scan rate for at least one area based on the coverage map.

25. A method of operating a wireless device, comprising:
receiving at least one search parameter determined by a network entity based on information collected by the network entity for a plurality of wireless devices; and
performing searches for signals in accordance with the at least one search parameter when the wireless device is out of service.

26. The method of claim 25, further comprising:
collecting information related to out-of-service events encountered by the wireless device; and
sending the collected information to the network entity for use in determining the at least one search parameter.

27. The method of claim 25, wherein the at least one search parameter comprises a scan rate, the method further comprising:
determining current operating conditions of the wireless device; and
adjusting the scan rate based on the current operating conditions, and wherein searches are performed in accordance with the adjusted scan rate.

28. The method of claim 25, wherein the at least one search parameter comprises a scan rate to use for entire duration in which the wireless device is covered by the network entity, and wherein searches are performed at the scan rate.

29. The method of claim 25, wherein the at least one search parameter comprises a scan rate changeable by the network entity during duration in which the wireless device is covered by the network entity, and wherein searches are performed at the scan rate.

30. An apparatus for wireless communication, comprising:
at least one processor configured to receive at least one search parameter determined by a network entity based on information collected by the network entity for a plurality of wireless devices, and to perform searches for signals in accordance with the at least one search parameter when a wireless device is out of service.

31. The apparatus of claim 30, wherein the at least one processor is configured to collect information related to out-of-service events encountered by the wireless device, and to send the collected information to the network entity for use in determining the at least one search parameter.

32. The apparatus of claim 30, wherein the at least one processor is configured to receive a scan rate from the network entity, to determine current operating conditions of the wireless device, to adjust the scan rate based on the current operating conditions, and to perform searches in accordance with the adjusted scan rate.

33. A method of operating a wireless device, comprising:
collecting information related to out-of-service events encountered by the wireless device;
determining at least one search parameter based on the collected information; and
performing searches for signals in accordance with the at least one search parameter when the wireless device is out of service.

34. The method of claim 33, wherein the collecting information comprises collecting information on out-of-service durations, locations of the wireless device, frequency of out-of-service events, signal strength, or a combination thereof.

35. The method of claim 33, wherein the determining the at least one search parameter comprises
determining current operating conditions of the wireless device, and
determining the at least one search parameter based further on the current operating conditions.

36. The method of claim 33, wherein the determining the at least one search parameter comprises
estimating an average out-of-service time for the wireless device based on the collected information, and
determining a scan rate based on the estimated average out-of-service time.

37. The method of claim 33, wherein the at least one search parameter comprises a first scan rate determined based on the collected information, the method further comprising:
receiving a second scan rate determined by a network entity based on information collected by the network entity for a plurality of wireless devices; and
determining a third scan rate based on the first and second scan rates, and
wherein searches are performed in accordance with the third scan rate when the wireless device is out of service.

38. An apparatus for wireless communication, comprising:
at least one processor configured to collect information related to out-of-service events encountered by a wireless device, to determine at least one search parameter based on the collected information, and to perform searches for signals in accordance with the at least one search parameter when the wireless device is out of service.

39. The apparatus of claim 38, wherein the at least one processor is configured to collect information on out-of-service durations, locations of the wireless device, frequency of out-of-service events, signal strength, or a combination thereof.

40. The apparatus of claim 38, wherein the at least one processor is configured to determine current operating conditions of the wireless device, and to determine the at least one search parameter based further on the current operating conditions.

41. The apparatus of claim 38, wherein the at least one processor is configured to estimate an average out-of-service time for the wireless device based on the collected information, and to determine a scan rate based on the estimated average out-of-service time.

42. The apparatus of claim 38, wherein the at least one processor is configured to determine a first scan rate based on the collected information, to receive a second scan rate determined by a network entity based on information collected by the network entity for a plurality of wireless devices, to determine a third scan rate based on the first and second scan rates, and to perform searches in accordance with the third scan rate when the wireless device is out of service.

43. An apparatus for wireless communication, comprising:
    means for receiving at least one search parameter determined by a network entity based on information collected by the network entity for a plurality of wireless devices; and
    means for performing searches for signals in accordance with the at least one search parameter when a wireless device is out of service.

44. A computer program product, comprising:
    a non-transitory computer-readable medium comprising:
        code for causing at least one computer to receive at least one search parameter determined by a network entity based on information collected by the network entity for a plurality of wireless devices; and
        code for causing the at least one computer to perform searches for signals in accordance with the at least one search parameter when a wireless device is out of service.

45. An apparatus for wireless communication, comprising:
    means for collecting information related to out-of-service events encountered by a wireless device;
    means for determining at least one search parameter based on the collected information; and
    means for performing searches for signals in accordance with the at least one search parameter when the wireless device is out of service.

46. A computer program product, comprising:
    a non-transitory computer-readable medium comprising:
        code for causing at least one computer to collect information related to out-of-service events encountered by a wireless device;
        code for causing the at least one computer to determine at least one search parameter based on the collected information; and
        code for causing the at least one computer to perform searches for signals in accordance with the at least one search parameter when the wireless device is out of service.

* * * * *